Aug. 14, 1962  K. S. VERNON  3,049,355
SEALS FOR BEARINGS
Filed Nov. 30, 1959
2 Sheets-Sheet 1

INVENTOR
KENNETH STANLEY VERNON
BY Kenwood Ross
ATTORNEY

Aug. 14, 1962   K. S. VERNON   3,049,355
SEALS FOR BEARINGS
Filed Nov. 30, 1959   2 Sheets-Sheet 2

INVENTOR
KENNETH STANLEY VERNON
BY Kenwood Ross
ATTORNEY

United States Patent Office 3,049,355
Patented Aug. 14, 1962

3,049,355
SEALS FOR BEARINGS
Kenneth Stanley Vernon, Burtonwood, Warrington, England, assignor to Burtonwood Engineering Company Limited, Burtonwood, Warrington, England
Filed Nov. 30, 1959, Ser. No. 856,068
1 Claim. (Cl. 277—94)

This invention relates to seals for anti-friction bearings, for example ball bearings and roller bearings, and relates to such seals of the kind which are made to fit peripherally into a groove in the outer (or inner) race of the bearing and to bear resiliently on the inner (or outer) race of such bearing, thereby operating to enclose the balls or rollers of the bearing and confining the grease in which such balls or rollers run as well as at the same time excluding dirt from the bearings.

This application is a continuation-in-part of my earlier application for Patent Serial No. 648,207 filed March 25, 1957, and now abandoned.

It is an object of the present invention to provide an improved seal which can be "snapped" into position in the said groove and be held firmly between the races of the bearing by reason of its own rigidity, whilst at the same time providing a light axial pressure at the sealing lip.

Many proposals for seals for ball and roller bearings have been made, in most of which an annular disc of rubber or like material was used to provide a wall between the races, and it has been proposed in some cases to attach metal reinforcements to such rubber parts or to assemble a metal reinforcement alongside in the rubber part.

The present invention has the advantage that the seal is a self-contained unit which has sufficient rigidity in itself not to require supplementary reinforcement, which has sufficient resilience on its groove-ward periphery to "snap" into the said groove in the bearing race, and which moreover is so formed as to provide only a very light axial pressure at the sealing lip, thereby not imposing any undue torsional resistance on the bearing. A sealing ring according to this invention has a rigid annular portion including a ring disc of metal or the like resistant to axial deflection, a resilient edge around such rigid portion to snap into the said peripheral groove, a sealing lip and, between such lip and the rigid portion an annular weakened zone allowing of axial deflection of the sealing lip with only light axial stress.

The accompanying drawings illustrate various embodiments of the improved seal:

As illustrated, the invention provides a seal for a ball or roller bearing comprising a flat rubber ring structure of thin section, which at the part (herein called the holding part) which is to be held in the said groove is provided with an annular reinforcement sufficient to resist axial deflection and, in a concentric zone between the said holding part and the sealing lip the seal is of reduced thickness to provide an annular hinge giving flexibility to the seal in an axial direction with only light axial stress at the sealing lip.

The reinforcement member used for the seal will usually be of metal, though it could be of a rigid synthetic plastic material, and it is either bonded firmly to one side of the rubber portion of the seal or, in some forms of the invention it is embedded within such portion. However, as in most cases these seals are of very little thickness, for example an overall thickness of from 1 to 1.5 mm., it is more preferable to bond the reinforcement ring to one side face of the rubber portion rather than enclose it within the rubber. In either event the rubber is allowed to run over the outer (or inner) edge of the reinforcing ring so as to provide the necessary resilience for a snap action into the groove of the race ring.

The reinforcement may be corrugated or similarly deformed, annularly or/and radially, it may be apertured to enhance its attachment to the rubber or other material, and/or it may be provided with notches and teeth on the edge nearest the sealing lip, which teeth may be slightly splayed out of the plane of the reinforcement to increase the axial thrust when the sealing lip is required to be stressed against the adjacent bearing race.

The reinforcement may be formed at the holding edge by rolling or folding over so as to form a bead which will enlarge the resilient edge and also increasing its resistance to collapse.

The median plane of the area or zone of less thickness which constitutes said annular hinge may be parallel with or identical with the median plane of the seal as a whole, or it may be at an angle to that plane.

Usually, the seal will have all its parts substantially symmetrical about a central plane, i.e. about a plane at right angles to the axis of the bearing. The invention may be further characterised however, in that, in cross section, there is a shoulder on one side of the seal where the annular hinge is formed, and this allows of the reinforcement being more easily positioned in the mould in which the seal is made, since an edge of the reinforcement may coincide with such shoulder.

Figure 1:
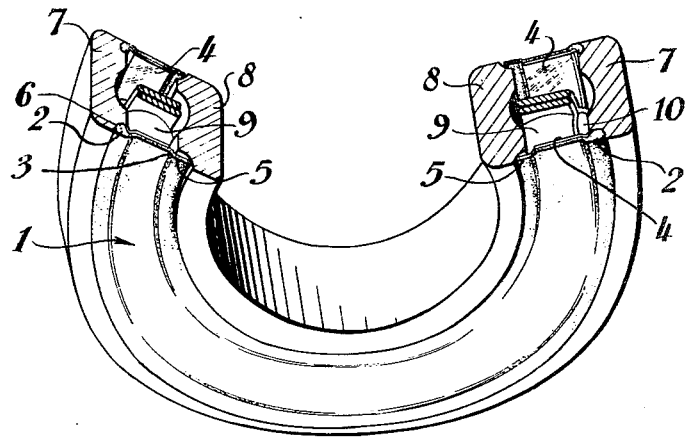
FIG. 1 is a cross-sectional perspective view of a ball bearing in which two of the improved sealing rings are in sealing position.

Referring now to FIG. 1, the bearing has at each side a sealing ring 1 which includes a rigid holding part 2, an annular weakened portion 3, a metal reinforcement 4, sealing lip 5 and resilient outer edge 6. This edge 6, as shown in the subsequent figures snaps into a groove in the outer race 7 of the bearing, the bearing including also the inner race 8, the ball cage 9 and the balls 10.

The rubber is formed with a thickening at 4 which tapers off to a sealing edge. The thin rubber zone between the inner edge of the reinforcement and the beginning of the thickening 4 provides the annular hinge which relieves any stress set up by axial displacement of the sealing edge and therefore leaves the holding part 2 free from any tendency to deflect or spring out of the groove in the ball race. Additionally, the thickened zone 4 gives stability to the sealing lip and tends to keep all parts of the actual sealing edge in a single plane.

Figure 2:
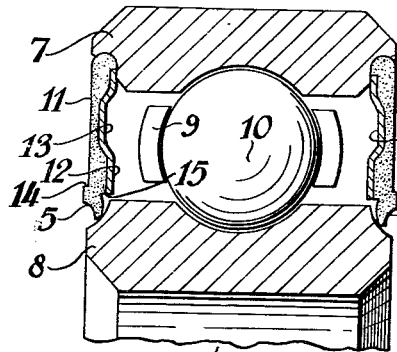
FIGS. 2–5 are cross sections of ball bearings with four other forms of the improved seal respectively, for use where the seal is required against an inner race ring.

Referring now to FIG. 2 there are outer and inner bearing races 7 and 8, the former having the groove for receiving the edge 6 of the holding portion of the seal, and there is an intermediate ball cage 9 and balls 10. The seal at each side of the bearing comprises an annular element 11 of rubber or the like and a reinforcement ring 12 which may be of metal. Such ring 12 has an annular corrugation 13, although it could have a series of radial corrugations, or both forms of corrugation could be provided in the one ring. The rubber portion 11 and the reinforcement 12 are bonded together over their meeting faces. As shown, the reinforcement 12 is bonded against one surface of the rubber but, in some cases, when the total thickness of the seal allows of this, it could be wholly embedded in the rubber.

As will be seen, one marginal edge of the reinforcement 12 extends sufficiently far outwardly as to overlie the adjacent face of the race 7, though this need not necessarily be so.

The rubber portion 11 of the seal is so formed that it has a concentric place of minimum thickness between an external shoulder 14 and an internal shoulder 15 where flexing may occur without imparting stress to the holding portion. The lip portion 5 is so formed that, when the seal is placed in position in the bearing, it is slightly flexed outwards and therefore has a slight sealing pressure against the race 8 the degree of such pressure being low because of the relief afforded by the said place of minimum thickness. This race 8 has an arcuate recess to receive the sealing lip 5, whereby, at all times a contact exists between the lip and the race. The said internal shoulder coincides with the inner peripheral edge of the reinforcement 12 and this allows of a shaping of the mould by which the location of the reinforcement therein is facilitated. It must be remembered that the seal parts are very thin.

Figure 3:
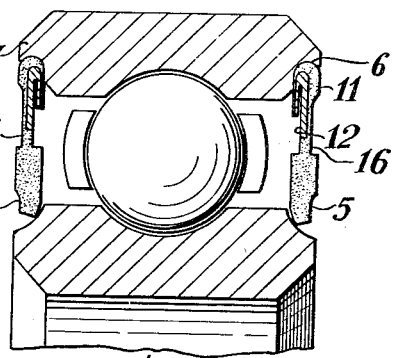

Referring now to FIG. 3, the reinforcement 12 is folded over at the outer edge which enters the groove 6. Here also there is a non-reinforced annular portion of reduced thickness in the rubber, see the area 16 which constitutes the annular hinge allowing of the necessary flexing of the seal without undesirable stresses.

Figure 4:
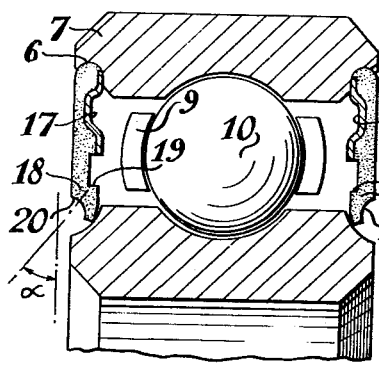

In FIG. 4 a reinforcement 17 with annular corrugation is shown, similar to the reinforcement 12 shown in FIG. 2, but of less width, and the rubber portion of the seal has a relatively thinner part 18 between an inner shoulder 19 and the outer curved face 20, allowing of the necessary flexing. In this case, and to a less extent in FIG. 2, the plane containing the section of minimum thickness is at an angle to the mean plane of the seal, see the reference α in FIG. 4.

Figure 5:
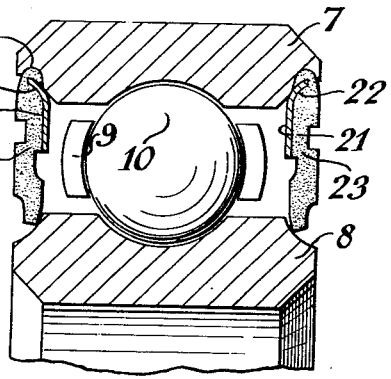
Figure 6:
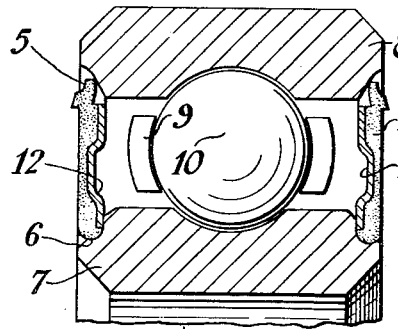
FIGS. 6–9 are views corresponding to FIGS. 2–5 but with the seals adapted for use where the seal is required against an outer ring.
Figure 7:
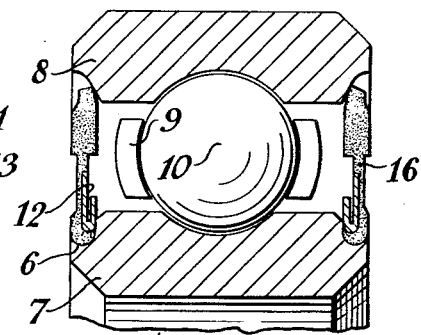
Figure 8:
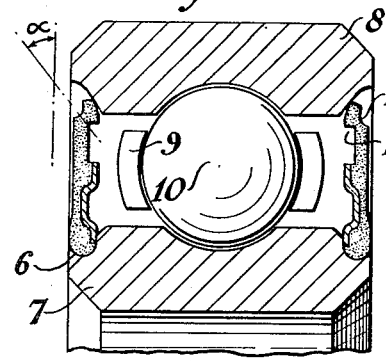
Figure 9:
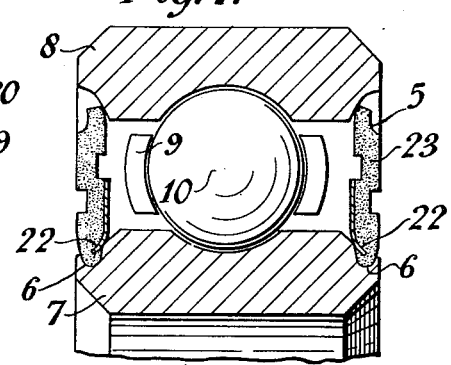

FIG. 5 shows a type of seal in which the reinforcement 21 is rolled or swaged to provide an arcuate section 22, at its outer margin one part of this arcuate section abutting against the outer race 7. In this embodiment also, the rubber portion of the seal has a thinner concentric zone at 23 to allow of the necessary flexing and axial hinging effect.

FIGS. 6–9 correspond respectively with FIGS. 2–5 except that they show cases where the seal is effected against the outer race of the bearing instead of against the inner race as in FIGS. 2–5. The same reference numerals are used for the several parts of the seal itself but the reference numerals 7 and 8 for the two races are reversed.

Figure 10:
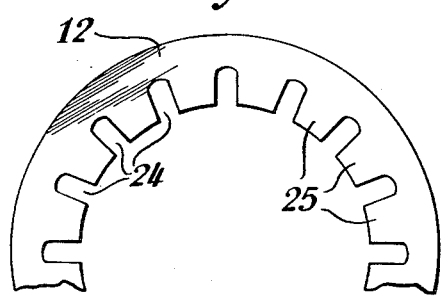
FIGS. 10–11 are face views of two forms of the annular reinforcement.

FIG. 10 shows one of several possible forms of annular reinforcement which has notches 24 on the inner edge (for an inner seal) and the intervening teeth 25 may have a slight axial set towards the face to be sealed in order to give a somewhat stiffer resilience to the seal. For an outer seal as in FIGS. 6–9, the notches 24 and teeth 25 would be on the outer edge of the ring.

Figure 11:
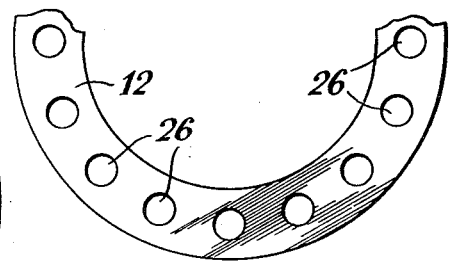

The reinforcement in FIG. 11 has apertures 26 to key into the rubber. These may be combined with the teeth of FIG. 10, and each of the features illustrated in FIGS. 10 and 11 may be incorporated in any of the reinforcements of FIGS. 2–9. Many other forms of reinforcement are possible within the scope of the invention. Also the reinforcements may be of other rigid material than metal, for example of a rigid synthetic plastic such as a thermo-setting plastic.

When rubber is referred to herein as the material for the seal, such term must be taken to include all the synthetic rubber-like materials or plastics materials now known as useful substitutes for rubber.

The seal may have one or more self-sealing apertures in the rubber portion, through which grease and other lubricant may be injected into the bearing. In the case of packed bearings however, such apertures may be found unnecessary.

A further improvement according to the invention consists in the use of seals of different colours at the opposite sides of a bearing so that, in the case of a semi-thrust bearing and a taper bearing or the like, the difference of colour may be associated with the respective ends of the bearing.

When the reinforcement is bonded on to a side face of the rubber it may be at the inner side of the seal, as in all the embodiments shown, or it may be at the outer side.

Figure 12:
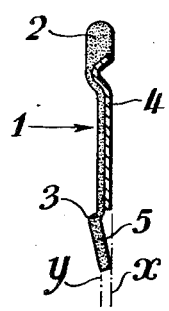
FIG. 12 is a diagrammatic cross section through one of the sealing rings in unstressed condition and showing the flexibility provided by the annular hinge.

Referring lastly to FIG. 12, when the seal is unstressed, before being placed in a bearing the sealing edge lies in a plane denoted by the broken line X. However, when in situ in the bearing the seal has the said edge pushed back to the line y but, because of the unreinforced annular weakened zone 3, stresses resulting from this axial displacement of the sealing lip are not sufficient to distort the holding part of the seal or to impart any tendency to such holding part to spring out of the groove in the bearing race. As a result the seal provides the advantages that it is substantially of flat form on each face, and it has a reinforcing ring of sufficient radial width to give the desired rigidity to resist deformation to a conical shape.

It has the resilient compressible outer edge to allow of the seal being "snapped" into position by mere axial pressure into the bearing and the annular hinge portion relieves the stresses which otherwise would occur by the axial deflection of the sealing lip when the seal is in position.

A seal of similar construction to any of those illustrated is adapted also for application between a bearing housing and a relatively rotating shaft to retain grease or exclude dirt.

What I claim is:

A sealing means adapted to be insertable and removable relative to a pair of substantially concentrically spaced and outer and inner rotatable members being rotative as to each other and each having a suitably configured annular groove and defining in combination the radially inner and outer confines of an annular lubricant chamber closed to prevent lateral egress of lubricant therefrom and ingress of deleterious material thereto at one side of the chamber comprising: a flat one-piece annular elastomeric member including a relatively wide concentric holding part of sufficient rigidity to remain constantly in its own plane adjacent the outer rotatable member and resist deformation under stress and constituting a static unstressed annular zone with its outermost edge configured as a seating edge for demountably engaging in and holding resiliently relative to the complemental annular groove of the outer rotatable member and a relatively narrow annular and concentric sealing-lip part of less rigid consistency adjacent the inner rotatable member with its outermost wiping portion tapering in section to a knife edge for deforming radially and laterally relative to the holding part and a relatively thin annular central part concentric with and disposed intermediate the holding and sealing-lip parts, the sealing-lip and central parts constituting an annular working zone of minimum thickness, the wiping portion of the sealing-lip part extending into laterally-spaced proximity centrally of the annular groove of the inner rotatable member for placing the knife edge in yieldably wiping engagement with the surface thereof and being adapted to be radially compressibly and axially distortable away from the chamber and laterally outwardly of the inner rotatable member, a flat annular metallic reinforcement member concentric and substantially coplanar with the central annular part of said elastomeric member and secured thereto at the lubricant chamber side thereof with the holding and sealing-lip parts of said elastomeric member extending radially beyond the opposite annular edges of said reinforcement member, the central annular part of said elastomeric member permitting the radial and lateral flexing of the wiping edge of the sealing-lip part out of the plane of the holding part to compensate for any radial and lateral misalignment between the inner and outer rotatable members relative to the sealing means.

References Cited in the file of this patent

UNITED STATES PATENTS

| | | |
|---|---|---|
| 2,467,049 | Peterson | Apr. 12, 1949 |
| 2,650,117 | Chambers, et al. | Aug. 25, 1953 |
| 2,734,757 | Martin | Feb. 14, 1956 |
| 2,755,113 | Bauhmheckel | July 17, 1956 |
| 2,962,308 | Cobb | Nov. 27, 1960 |

FOREIGN PATENTS

| | | |
|---|---|---|
| 465,991 | Italy | Oct. 8, 1951 |
| 1,084,023 | France | June 30, 1954 |